US007046865B2

(12) United States Patent
Kasutani (10) Patent No.: US 7,046,865 B2
(45) Date of Patent: May 16, 2006

(54) DETERMINATION OF SIMILARITY USING WEIGHTING VALUE DEPENDING ON THE TYPE OF CHARACTERISTIC

(75) Inventor: Eiji Kasutani, Tokyo (JP)

(73) Assignee: NEC Corporation, Tokyo (JP)

( * ) Notice: Subject to any disclaimer, the term of this patent is extended or adjusted under 35 U.S.C. 154(b) by 728 days.

(21) Appl. No.: 10/274,946

(22) Filed: Oct. 22, 2002

(65) Prior Publication Data

US 2003/0081859 A1    May 1, 2003

(30) Foreign Application Priority Data

Oct. 30, 2001    (JP)    ............... 2001-332605

(51) Int. Cl.
*G06K 9/54*    (2006.01)

(52) U.S. Cl. ............ 382/305; 382/165; 382/219; 707/3

(58) Field of Classification Search ............ 382/305, 382/165, 219, 286; 707/3, 6
See application file for complete search history.

(56) References Cited

U.S. PATENT DOCUMENTS 5,487,133 A * 1/1996 Park et al. ............. 706/20

5,621,752 A * 4/1997 Antonio et al. ............. 375/144
5,740,326 A * 4/1998 Boulet et al. ............. 706/27
5,831,977 A * 11/1998 Dent ............. 370/335

FOREIGN PATENT DOCUMENTS

| JP | 2000-048181 | 2/2000 |
| JP | 2000-163576 | 6/2000 |
| JP | 2000-216979 | 8/2000 |
| JP | 2000-259832 | 9/2000 |

* cited by examiner

*Primary Examiner*—Samir Ahmed
*Assistant Examiner*—Yosef Kassa
(74) *Attorney, Agent, or Firm*—Young & Thompson (57) ABSTRACT

A similarity determining apparatus is disclosed which determines whether a query signal and a search signal are similar to each other or not. The similarity determining apparatus determines weighting values for elements of a signal characteristic of a first type, which are used in determining the distance between a signal characteristic of a first type of a search signal and a signal characteristic of a first type of a query signal, depending on a second type of signal characteristics. The similarity determining apparatus calculates the distance between the signal characteristic of the first type of the search signal and the signal characteristic of the first type of the query signal, based on the determined weighting values. The similarity determining apparatus calculates the distance between a signal characteristic of a second type of the search signal and a signal characteristic of a second type of the query signal.

20 Claims, 10 Drawing Sheets

DETERMINATION OF SIMILARITY USING WEIGHTING VALUE DEPENDING ON THE TYPE OF CHARACTERISTIC

BACKGROUND OF THE INVENTION

1. Field of the Invention

The present invention relates to a method of and an apparatus for determining whether a query signal and a search signal are similar to each other or not in similar image or audio retrieval processes.

2. Description of the Related Art

Similar signal retrieval techniques for retrieving signal data similar to a given signal (query signal) from signal data stored in a signal database which contains image or audio signal data are used for similar image retrieval, for example.

Many various and similar signal retrieval techniques have been proposed in the art. The proposed similar signal retrieval techniques mainly use characteristics representing overall color information of an image or a collection of characteristics representing local color information of an image.

Most of the similar signal retrieval techniques which use overall color information as image characteristics employ a process of calculating a color histogram which is representative of color layouts of pixels contained in an image and retrieving a similar image from the similarity of the color histogram. The color histogram refers to image characteristics comprising colors of an image and their ratios. Color histogram information may include a histogram of all colors contained in an image and a histogram of one or plural representative colors of an image and their ratios. The above similar signal retrieval techniques, however, are disadvantageous in that they do not reflect a spatial arrangement of the colors of an image, i.e., they do not reflect a layout structure of the colors of an image.

One image retrieval system is disclosed in U.S. Pat. No. 5,579,471 which uses a collection of characteristics representing local color information of an image for thereby taking into account a spatial arrangement of the colors of an image. In one mode of operation of the disclosed image retrieval system, each of the images contained in a database is divided into blocks. Each of the blocks is grouped into subsets of similar colors, and the greatest one of the subsets is selected. The average color of the selected subset is selected as the representative color of the block.

Japanese laid-open patent publication No. 2000-259832 discloses an image retrieval apparatus which uses image characteristics representing a spatial arrangement of colors which is expressed on a frequency axis. The image retrieval apparatus employs image frequency conversion coefficients having values indicative of energies in respective frequency bands, the values being obtained by dividing the frequency distribution of the spectrum of the color (average color) of an image into the frequency bands and analyzing the frequencies in the frequency bands using orthogonal matrixes.

Figure 1:
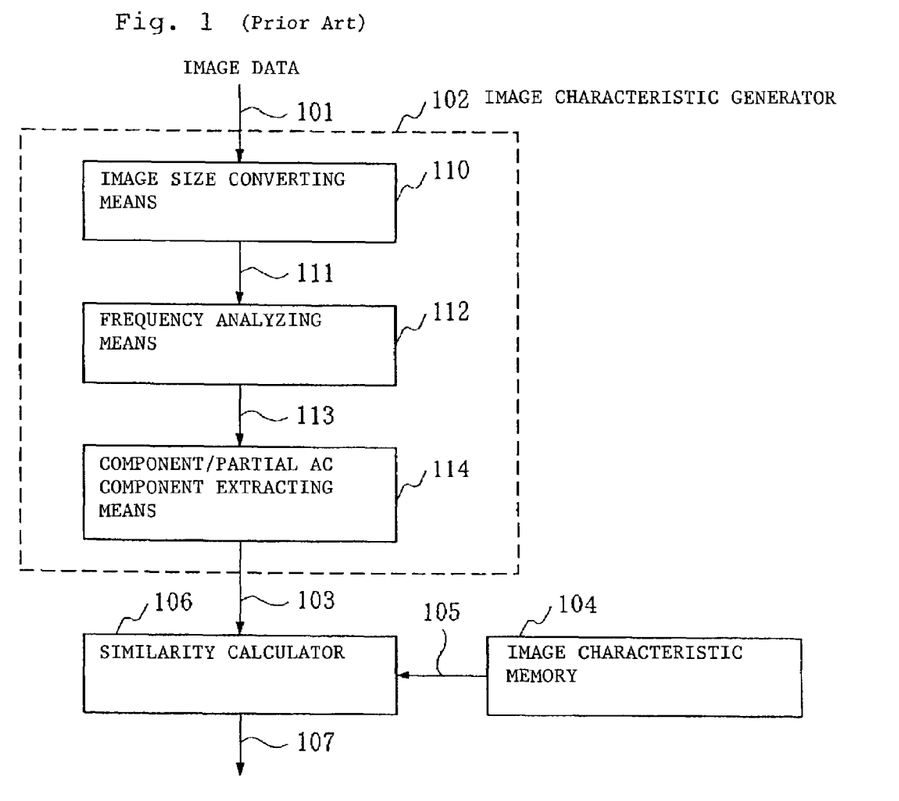
FIG. 1 is a block diagram of a conventional image retrieval apparatus.

FIG. 1 of the accompanying drawings shows in block form an arrangement of the disclosed image retrieval apparatus. As shown in FIG. 1, the image retrieval apparatus has image characteristic generator 102 for generating characteristic 103 from image data 101, image characteristic memory 104 storing characteristics in advance therein, and similarity calculator 106 for calculating similarity 107 between characteristic 103 and characteristic 105 stored in image characteristic memory 104. Image characteristic generator 102 comprises image size converting means 110 for generating image 111 of fixed size from image data 101, frequency analyzing means 112 for analyzing frequencies of image 111, and DC component/partial AC component extracting means 114 for extracting DC components and partial AC components of frequency conversion coefficients 113 produced by frequency analyzing means 112 as characteristic 103.

For increasing the accuracy of retrieval in the image retrieval apparatus, it is necessary to increase the accuracy with which to determine a similarity between images. Increasing the accuracy with which to determine a similarity between images may be based on using both a characteristic representing a color layout and a characteristic representing a color histogram. If a DCT (Discrete Cosine Transform) coefficient is used as a color histogram characteristic and a color histogram is used as a color layout characteristic, then a similarity between images is determined as follows: First, the distance between the DCT coefficient of a query image and the DCT coefficient of a search image, and the distance between the color histogram of the query image and the color histogram of the search image are calculated. Then, the calculated distances are added together, and a similarity between the query image and the search image is determined on the basis of the sum of the distances.

Since the DC component of the DCT coefficient represents color information as the average color of an image in the above example, the DCT coefficient indicates not only the general color histogram of the image, but also the representative color of the image. Therefore, when the distance between the DCT coefficients indicative of representative colors and the distance between the color histograms are added together, the determined similarity largely reflects a similarity between the representative colors. Because the color layout characteristic and the color histogram characteristic are not necessarily characteristics of entirely different natures, even if the distance between color layout characteristics and the distance between color histogram characteristics are added to each other for comparison therebetween, and a similarity is determined based on the sum of the distances, the determined similarity includes an emphasized element that represents a property shared by both types of the characteristics, decreasing the accuracy of retrieval.

Characteristics of audio signals are also subject to similar limitations. A audio signal interval similar to a audio signal interval having a certain length is retrieved by using both a frequency distribution characteristic extracted from the entire audio signal interval and a collection of frequency distribution characteristics extracted from respective divided segments of the audio signal interval. Since those types of the frequency distribution characteristics are not necessarily characteristics of entirely different natures, even if the distance between frequency distribution characteristics of one type and the distance between frequency distribution characteristics of the other type are added to each other, and a similar audio signal interval is retrieved on the basis of the sum of the distances, the determined similarity includes an emphasized element that represents a property shared by both types of the characteristics.

SUMMARY OF THE INVENTION

It is an object of the present invention to provide an apparatus for determining, with high accuracy, a similarity between a query signal and a search signal using a plurality of types of characteristics.

To achieve the above object, a similarity determining apparatus according to the present invention determines weighting values for elements of a signal characteristic of a first type, which are used in determining the distance between a signal characteristic of a first type of a search signal and a signal characteristic of a first type of a query signal, depending on a second type of signal characteristics. The similarity determining apparatus calculates the distance between the signal characteristic of the first type of the search signal and the signal characteristic of the first type of the query signal, based on the determined weighting values. The similarity determining apparatus calculates the distance between a signal characteristic of a second type of the search signal and a signal characteristic of a second type of the query signal. The similarity determining apparatus determines a similarity between the search signal and the query signal based on the calculated distances.

Since the distance between the signal characteristics of the first type is calculated using the weighting values, if elements having a common nature shared by the signal characteristics of the second type are included, then it is possible to calculate the distance between the signal characteristics of the first type, excluding the effect of the above elements. As a result, when a similarity between the query signal and the search signal is determined on the basis of the distance between the signal characteristics of the first type and the distance between the signal characteristics of the second type, a similarity related to the common elements contained in both the signal characteristics of the first and second types is prevented from being largely reflected in the determined similarity between the query signal and the search signal, so that the similarity between the query signal and the search signal can be determined with increased accuracy.

If the search signal and the query signal comprise images, then a color layout characteristic and a color histogram characteristic may be used as the signal characteristics of the first and second types. The weighting values may comprise weighting values for DC components of the signal characteristics of the first type, for example.

To allow the similarity determining apparatus to use a weight determining means for determining weighting values for DC components even if the signal characteristics of the first type have not been divided into a DC component and other components, the similarity determining apparatus has a signal characteristic converting means for converting the signal characteristics of the first type into a DC component and other components. The similarity determining apparatus also has a means for calculating the distance between the signal characteristic of the first type of the search signal and the signal characteristic of the first type of the query signal, which have been converted by the signal characteristic converting means, based on the weighting values determined by the weight determining means.

The above and other objects, features, and advantages of the present invention will become apparent from the following description with reference to the accompanying drawings which illustrate examples of the present invention.

DESCRIPTION OF THE PREFERRED EMBODIMENTS

In the description that follows, a color layout characteristic and a color histogram characteristic are used as a signal characteristic of a first type and a signal characteristic of a second type, respectively, a color histogram is used as the color layout characteristic, and a coefficient of a low-frequency component of DCT (Discrete Cosine Transform), or a collection of color layout characteristics assigned to respective divided rectangular areas of an image, is used as the color histogram characteristic. However, the signal characteristic of the first type and the signal characteristic of the second type are not limited to the above characteristics, but may be any characteristics insofar as they have similar natures. For example, one or more of a dominant color descriptor, a color structure descriptor, and a scalable color descriptor which are referred to in "Color and Texture Descriptors", IEEE Transactions on Circuits and Systems for Video Technology Vol. 11, No. 6, June 2001 may be used as the color layout characteristic, and a color layout descriptor, an edge histogram descriptor, or a collection of color layout characteristics assigned to respective divided rectangular areas (grids) of an image may be used as the color histogram characteristic. The color layout characteristic may comprise a characteristic representing overall color information of an image, and the color histogram characteristic may comprise a characteristic representing local color information of an image.

1st Embodiment

Figure 2:
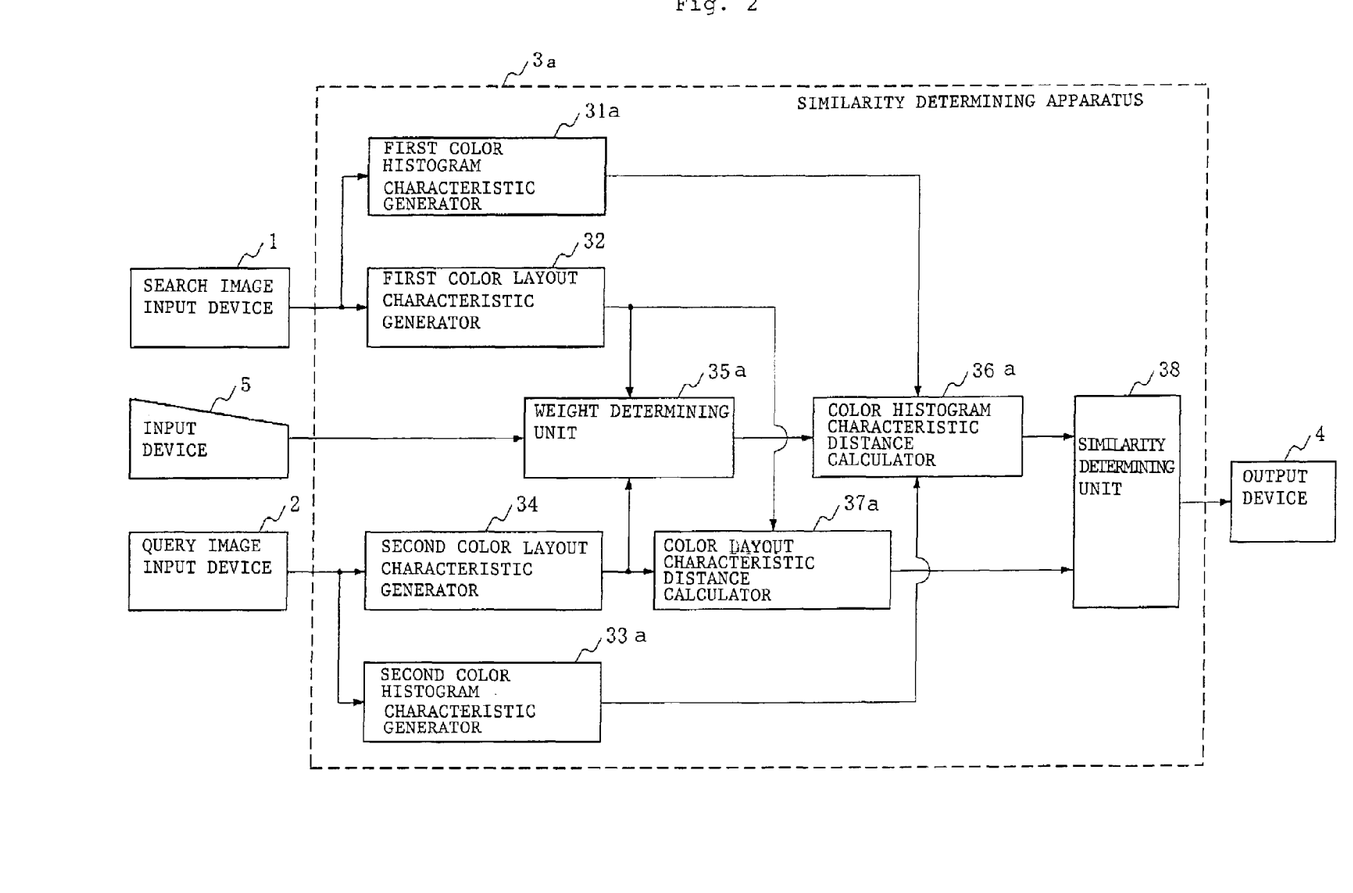
FIG. 2 is a block diagram of an apparatus for determining a similarity according to a first embodiment of the present invention.

FIG. 2 shows in block form an apparatus for determining a similarity according to a first embodiment of the present invention. The apparatus shown in FIG. 2 is used as part of an image retrieval system. As shown in FIG. 2, the similarity determining apparatus, generally denoted by 3a, is connected to search image input device 1 for entering an image to be searched for, i.e., a search image, query image input device 2 for entering a query image for use in retrieval, e.g., a digital photograph or a handwritten sketch, output device 4 such as a display device, a printing device, or the like for outputting a similarity determined by similarity determining apparatus 3a, and input device 5 such as a keyboard, etc.

Similarity determining apparatus 3a serves to determine a similarity between search images that are successively entered from search image input device 1 and a query image entered from query image input device 2. Similarity determining apparatus 3a comprises first and second color histogram characteristic generators 31a, 33a, first and second color layout characteristic generators 32, 34, weight determining unit 35a, color histogram characteristic distance calculator 36a, color layout characteristic distance calculator 37a, and similarity determining unit 38.

Each time first color histogram characteristic generator 31a is supplied with a search image from search image input device 1, first color histogram characteristic generator 31a converts the search image into a matrix of local representative colors and the reafter performs DCT transformation of the converted matrix and quantizing the transformed DCT coefficients. In the present embodiment, low-frequency components are extracted as orthogonal matrixes by DCT. However, low-frequency components may be extracted by a Fourier transform or a wavelet transform.

Each time first color layout characteristic generator 32 is supplied with a search image from search image input device 1, first color layout characteristic generator 32 calculates a color histogram using pixel values of the supplied search image. The color histogram may be a histogram of all the colors contained in the search image or a histogram of one or more representative colors and their color layouts.

Second color histogram characteristic generator 33a converts a query image entered from query image input device 2 into an image of fixed size, and extracts values indicative of energies in respective frequency bands, the values being obtained by dividing the frequency distribution of the spectrum of the color of the image into the frequency bands and analyzing the frequencies in the frequency bands using orthogonal matrixes. Second color histogram characteristic generator 33a is identical to first color histogram characteristic generator 31a.

Second color layout characteristic generator 34 calculates a color histogram using pixel values of a search image entered from query image input device 2. Second color layout characteristic generator 34 is identical to first color layout characteristic generator 32.

Weight determining unit 35a determines weighting values for elements contained in color histogram characteristics, which are used in calculating the distance between color histogram characteristics generated by respective first and second color histogram characteristic generators 31a, 33a. Weight determining unit 35a determines the weighting values depending on the type of color layout characteristics generated by first and second color layout characteristic generators 32, 34. The type of color layout characteristics refers to one of the kinds of color layout characteristics or one of the values of parameters of color layout characteristics. The user uses input device 5 to instruct weight determining unit 35a to determine which is to be used as the type of color layout characteristics. The kinds of color layout characteristics include a color histogram, a scalable color descriptor, a dominant color descriptor, a color structure descriptor, etc. The values of parameters of color layout characteristics include, for a color histogram, for example, a value indicative of the number and ratios of representative colors contained in the color histogram, a value indicative of the extent of colors on the histogram, a value indicative of how colors are concentrated, etc.

If the user chooses the values of parameters of color layout characteristics as the type of color layout characteristics, then weighting values for a DC component (average color) of the DCT coefficient are determined depending mainly on the number and ratios of representative colors contained in a color histogram and the value indicative of the extent of colors on the histogram, the value indicative of how colors are concentrated. For example, if the values of parameters of a color layout characteristic of a query image indicate that the number of representative colors of the query image is small and the frequency of the representative colors is localized, then since it is highly possible that the most frequent color of the color histogram and the DC component of the DCT coefficient have highly similar values, it is possible to greatly reduce or set to zero the weighting value for the DC component of the DCT coefficient. Such a process can easily be carried out by using an association table (not shown) of the values of parameters of a color layout characteristic of a query image and weighting values corresponding thereto.

If the user chooses the kind of a color layout characteristic as the type of color layout characteristics, then weight determining unit 35a determines weighting values depending on the kind of a color layout characteristic. For example, if the type of color layout characteristics is a color histogram, then weight determining unit 35a judges that the DC component of the DCT coefficient will not be used, i.e., the weighting values will be set to zero. weight determining unit 35a may set weighting values for a DC component contained in a color layout descriptor or the like depending on which of a scalable color descriptor, a dominant color descriptor, and a color structure descriptor is used. Weight determining unit 35a may change weighting values for a DC component when only one kind of a color layout characteristic is used and when two or more kinds of color layout characteristics are used.

Color histogram characteristic distance calculator 36a calculates the distance between a characteristic generated by first color histogram characteristic generator 31a and a characteristic generated by second color histogram characteristic generator 33a, using weighing values determined by weight determining unit 35a. The distance may be defined in various ways. For example, the distance between low-frequency components of DCT coefficients is defined as follows: A distance D between two characteristics is expressed by the following equation (1):

$$D = \sqrt{\sum_{i \in (Y)} w1_i(Y_i - Y_i')^2} + \sqrt{\sum_{i \in (Cb)} w2_i(Cb_i - Cb_i')^2} + \sqrt{\sum_{i \in (Cr)} w3_i(Cr_i - Cr_i')^2} \quad (1)$$

where Yi, Cbi, Cri represent ith DCT coefficients, and wli through w3i represent weighting coefficients. The weighting coefficients may be set to different values depending on the frequency band of DCT coefficients. Particularly, if color histogram characteristics are used alone, for example, then the weighting coefficients may be used in the descending order of powers of 2 in a zigzag scan. The weighting value for the DC component determined by weight determining unit 35a is used as weighting coefficients w10, w20, w30 for the DC component.

Color layout characteristic distance calculator 37a calculates the distance between a characteristic generated by first color layout characteristic generator 32 and a characteristic generated by second color layout characteristic generator 34.

While the distance may be defined in various ways, an L1 norm or an L2 norm may be used as the distance.

Similarity determining unit 38 determines a similarity between a search image and a query image based on the distance calculated by color histogram characteristic distance calculator 36a and the distance calculated by color layout characteristic distance calculator 37a. More specifically, each time similarity determining unit 38 is supplied with a search image from search image input device 1, similarity determining unit 38 weighs and adds the distance calculated by color histogram characteristic distance calculator 36a and the distance calculated by color layout characteristic distance calculator 37a, associates the sum of the distances with an image identifier of the search image, and holds the image identifier thus associated. If it is assumed that a jth search image has an image identifier IDj, then when the above process is performed on all search images that have been entered, similarity determining unit 38 sorts out the held image identifiers in the ascending order of the magnitudes of the sums of distances, and outputs the sorted result to output device 4. Since the image identifiers of search images are output in the descending order of similarities with the query image to output device 4, the user can obtain a search image having a high similarity to the query image by designating an image identifier which is sorted out later. A similarity may be determined by comparing the sum of the distances with a threshold, rather than the above process.

An operation sequence of the similarity determining apparatus 3a will be described below with reference to FIG. 3.

Second color histogram characteristic generator 33a and second color layout characteristic generator 34 are supplied with a query image entered from query image input device 2 in step 101, and then generate a color histogram characteristic and a color layout characteristic, respectively, of the query image in step 102.

Thereafter, first color histogram characteristic generator 31a and first color layout characteristic generator 32 are supplied with a first search image entered from search image input device 1 in step 103, and then generate a color histogram characteristic and a color layout characteristic, respectively, of the search image in step 104. Then, weight determining unit 35a determines weighting values for respective elements of the color histogram characteristics depending on the type of the color layout characteristics in step 105a. Then, color histogram characteristic distance calculator 36a calculates the distance between the color histogram characteristics using the weighting values, and color layout characteristic distance calculator 37a calculates the distance between the color layout characteristics in step 106a. Similarity determining unit 38 weighs and adds the calculated distances, associates the sum of the distances with an image identifier of the search image, and holds the image identifier thus associated in step 107.

The above processing in steps 103 through 107 is effected on all the search images. After the above processing is effected on all the search images, the answer to step 108 becomes affirmative. Then, similarity determining unit 38 sorts out the image identifiers held thereby in the ascending order of the magnitudes of the sums of distances in step 109, and outputs the sorted result to output device 4 in step 110.

In the present embodiment, only an AC component may be extracted at the stage of extracting color histogram characteristics, instead of setting to zero weighting values for a DC component.

According to the present embodiment, as described above, weight determining unit 35a determines weighting values for respective elements of the color histogram characteristics depending on the type of the color layout characteristics, and color histogram characteristic distance calculator 36a calculates the distance between a characteristic generated by first color histogram characteristic generator 31a and a characteristic generated by second color histogram characteristic generator 33a, using the weighing values determined by weight determining unit 35a. Therefore, color histogram characteristic distance calculator 36a can calculate the distance between the color histogram characteristics, excluding elements of a common nature contained in both the color histogram characteristics and the color layout characteristics. As a result, when a similarity between the query image and the search image is determined on the basis of the color histogram characteristic distance and the color layout characteristic distance, a similarity related to the common elements contained in both the color histogram characteristics and the color layout characteristics is prevented from being largely reflected in the determined similarity between the query image and the search image, so that the similarity between the query image and the search image can be determined with increased accuracy.

2nd Embodiment

Figure 4:
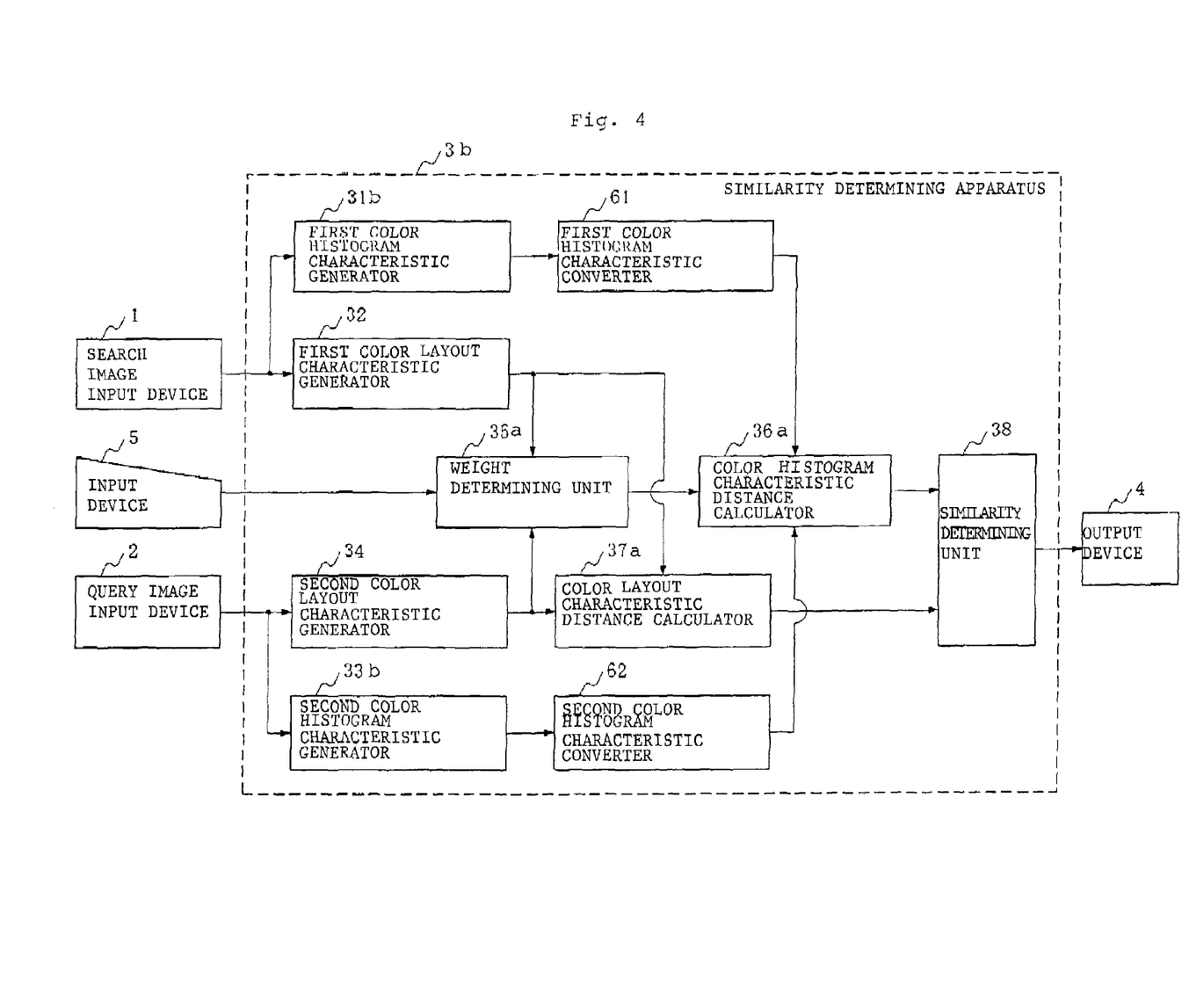
FIG. 4 is a block diagram of an apparatus for determining a similarity according to a second embodiment of the present invention.

FIG. 4 shows in block form an apparatus for determining a similarity according to a second embodiment of the present invention. As shown in FIG. 4, the similarity determining apparatus, generally denoted by 3b, is different from the similarity determining apparatus 3a shown in FIG. 2 in that it additionally has first and second color histogram characteristic converters 61, 62, and includes first and second color histogram characteristic generators 31b, 33b in place of first and second color histogram characteristic generators 31a, 33a.

First color histogram characteristic generator 31b divides a search image into rectangular areas, and uses a collection of color layout characteristics assigned respectively to the rectangular areas as a color histogram characteristic. Second color histogram characteristic generator 33b divides a query image into rectangular areas, and uses a collection of color layout characteristics assigned respectively to the rectangular areas as a color histogram characteristic.

First color histogram characteristic converter 61 converts the color histogram characteristic of a search image into a DC component and other components. Second color histogram characteristic converter 62 converts the color histogram characteristic of a query image into a DC component and other components.

An operation sequence of the similarity determining apparatus 3b will be described below with reference to FIG. 5.

Figure 3:
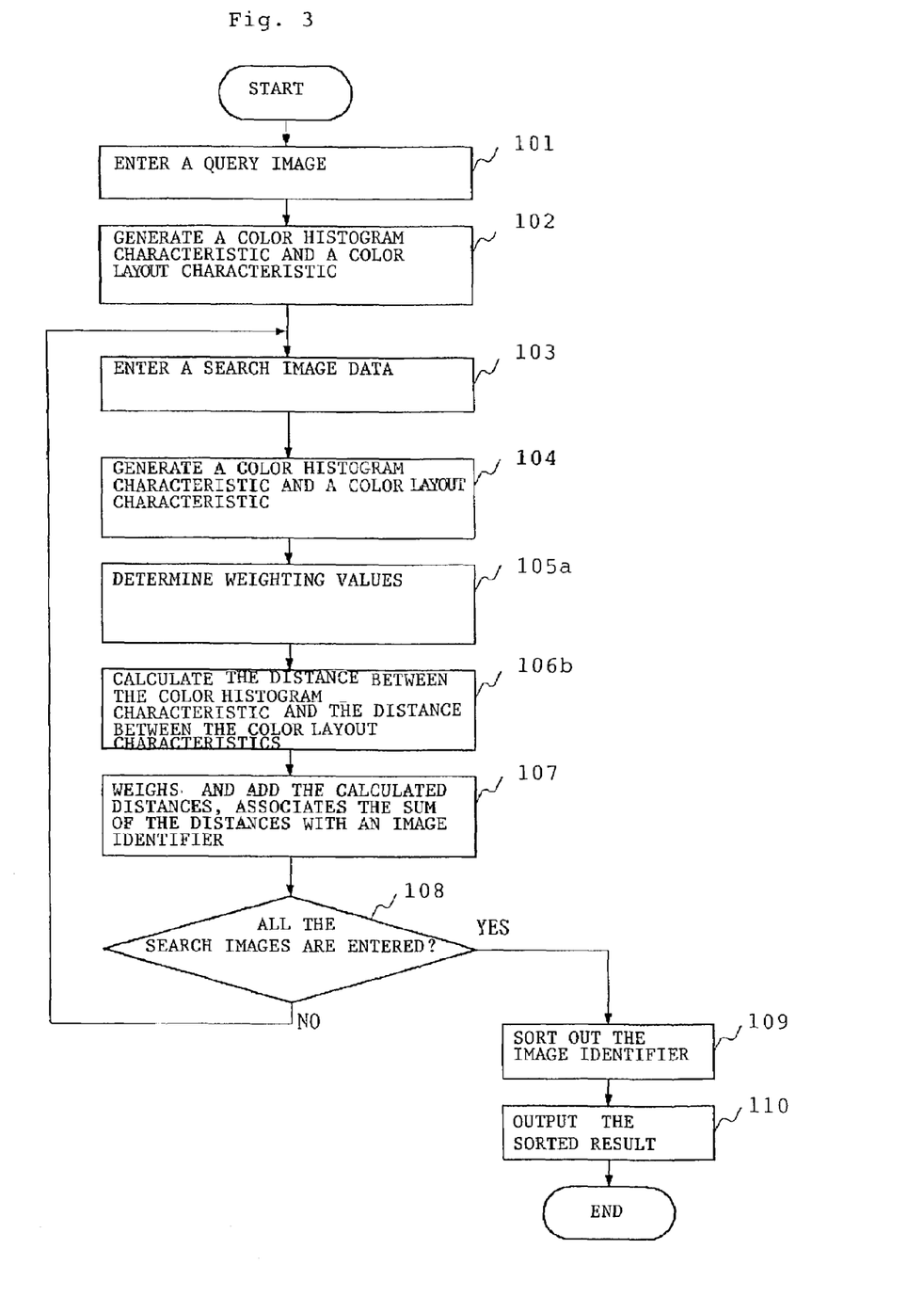
FIG. 3 is a flowchart of an operation sequence of the apparatus for determining a similarity according to the first embodiment of the present invention.
Figure 5:
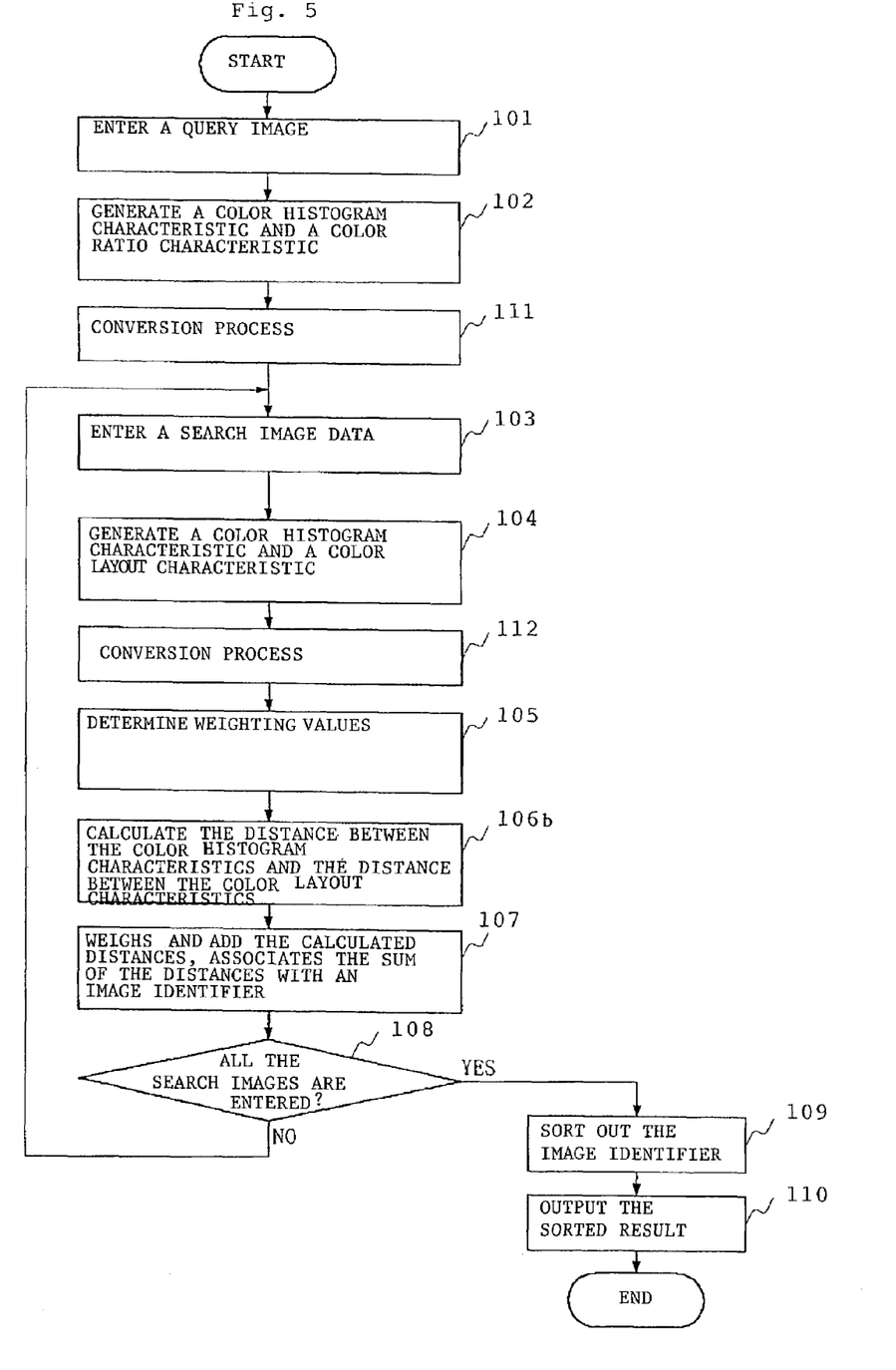
FIG. 5 is a flowchart of an operation sequence of the apparatus for determining a similarity according to the second embodiment of the present invention.

The operation sequence shown in FIG. 5 differs from the operation sequence shown in FIG. 3 in that a conversion process in step 111 carried out by second color histogram characteristic converter 62 is inserted between steps 102, 103, and a conversion process in step 112 carried out by first color histogram characteristic converter 61 is inserted between steps 104, 105a. Therefore, only steps 111, 112 will be described below.

Figure 6:
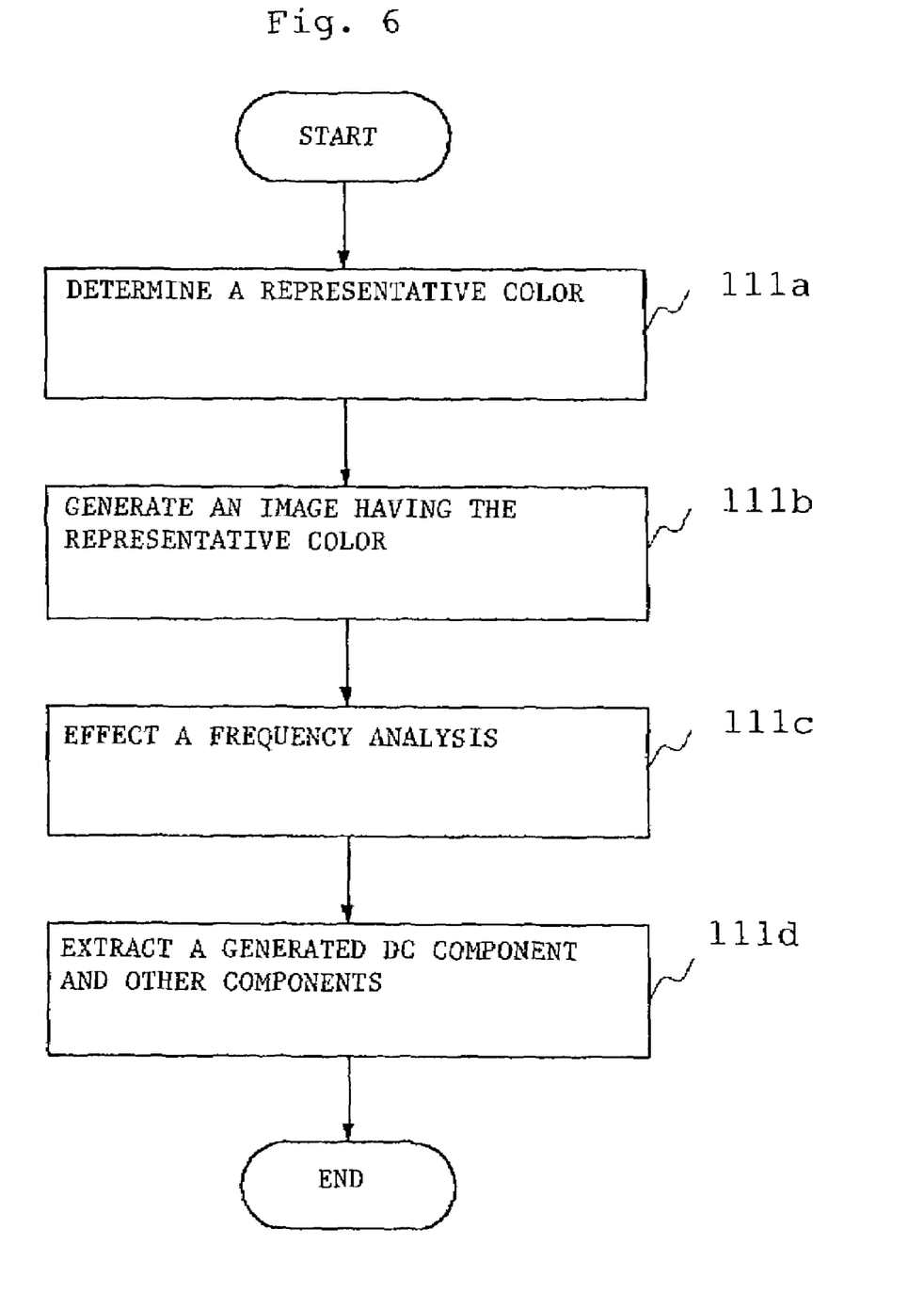
FIG. 6 is a flowchart of a processing sequence of color histogram characteristic converters in the apparatus shown in FIG. 4.

FIG. 6 shows a processing sequence of first and second color histogram characteristic converters 61, 62, using a collection of color layout characteristics assigned respectively to divided rectangular areas of an image as a color histogram characteristic.

After second color histogram characteristic generator 33b generates a color histogram characteristic of the query image in step 102 shown in FIG. 5, second color histogram characteristic converter 62 performs a conversion process in step 111. Specifically, as shown in FIG. 6, second color histogram characteristic converter 62 determines a representative color based on color layout characteristics contained in respective rectangular areas of the color histogram characteristic of the query image. A representative color may be determined by multiplying colors by their ratios and adding all the sums or regarding a most frequent value or a central value as a representative color. In step 111b, second color histogram characteristic converter 62 generates an image having the representative color calculated from the rectangular areas. In step 111c, second color histogram characteristic converter 62 effects a frequency analysis on the generated image. In step 111d, second color histogram characteristic converter 62 extracts a generated DC component and other components. If a Hadamard transform or a DCT is used for the frequency analysis, then the image can be converted into a DC component and other components. Alternatively, a DC component can be generated by calculating representative colors or average colors in the respective rectangular areas and simply calculating an average value of the calculated representative colors or average colors.

After first color histogram characteristic generator 31b generates a color histogram characteristic of the search image in step 104 shown in FIG. 5, first color histogram characteristic converter 61 converts the color histogram characteristic generated by first color histogram characteristic generator 31b in step 112. In step 112, first color histogram characteristic converter 61 performs the processing sequence shown in FIG. 6 on the color histogram characteristic of the search image.

According to the present embodiment, as described above, weight determining unit 35a determines weighting values for respective elements of the color histogram characteristics depending on the type of the color layout characteristics, and color histogram characteristic distance calculator 36a calculates the distance between a characteristic generated by first color histogram characteristic generator 31b and a characteristic generated by second color histogram characteristic generator 33b, using the weighing values determined by weight determining unit 35b. Therefore, color histogram characteristic distance calculator 36a can calculate the distance between the color histogram characteristics, excluding elements of a common nature contained in both the color histogram characteristics and the color layout characteristics. As a result, when a similarity between the query image and the search image is determined on the basis of the color histogram characteristic distance and the color layout characteristic distance, a similarity related to the common elements contained in both the color histogram characteristics and the color layout characteristics is prevented from being largely reflected in the determined similarity between the query image and the search image, so that the similarity between the query image and the search image can be determined with increased accuracy.

3rd Embodiment

Figure 7:
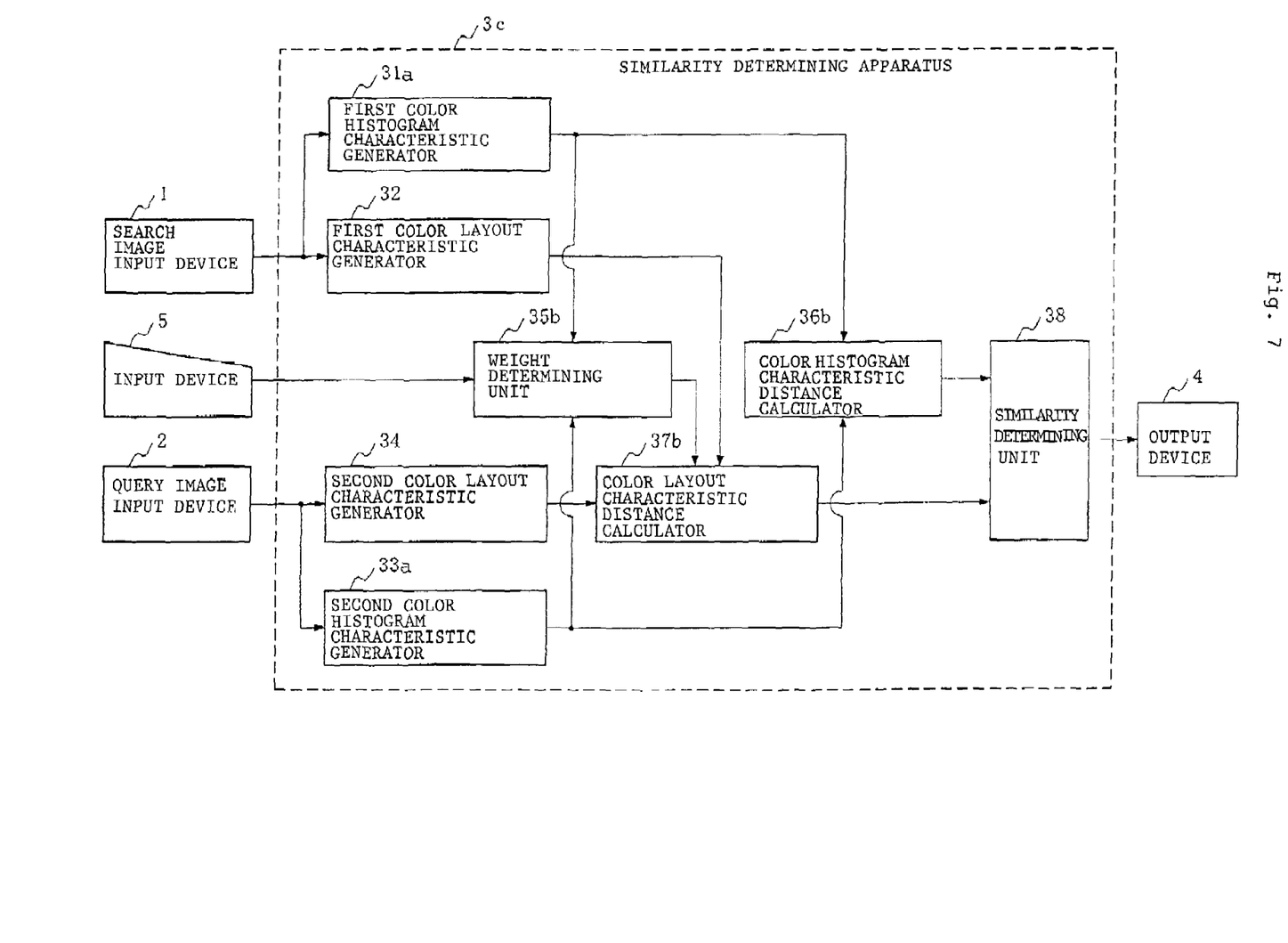
FIG. 7 is a block diagram of an apparatus for determining a similarity according to a third embodiment of the present invention.

FIG. 7 shows in block form an apparatus for determining a similarity according to a third embodiment of the present invention. As shown in FIG. 7, the similarity determining apparatus, generally denoted by 3c, is different from the similarity determining apparatus 3a shown in FIG. 2 in that it has weight determining unit 35c instead of weight determining unit 35a, color histogram characteristic distance calculator 36b instead of color histogram characteristic distance calculator 36a, and color layout characteristic distance calculator 37b instead of color layout characteristic distance calculator 37a.

Weight determining unit 35b determines weighting values for respective elements of the color histogram characteristics depending on the type of the color layout characteristics. For example, weight determining unit 35c uses a variance from the center of the AC component of the DCT coefficient as the type of the color layout characteristics, and determines weighting values for the spread or concentration of the representative color contained in the color histogram.

Color layout characteristic distance calculator 37b calculates the distance between a color layout characteristic generated by first color layout characteristic generator 32 and a color layout characteristic generated by second color layout characteristic generator 34, using the weighing values determined by weight determining unit 35b. The color histogram characteristic does not need to be of one kind, and weighting values may be determined depending on the kind or number of color histogram characteristics.

Color histogram characteristic distance generator 36b calculates the distance between a color histogram characteristic generated by first color histogram characteristic generator 31a and a color histogram characteristic generated by second color histogram characteristic generator 33a.

Figure 8:
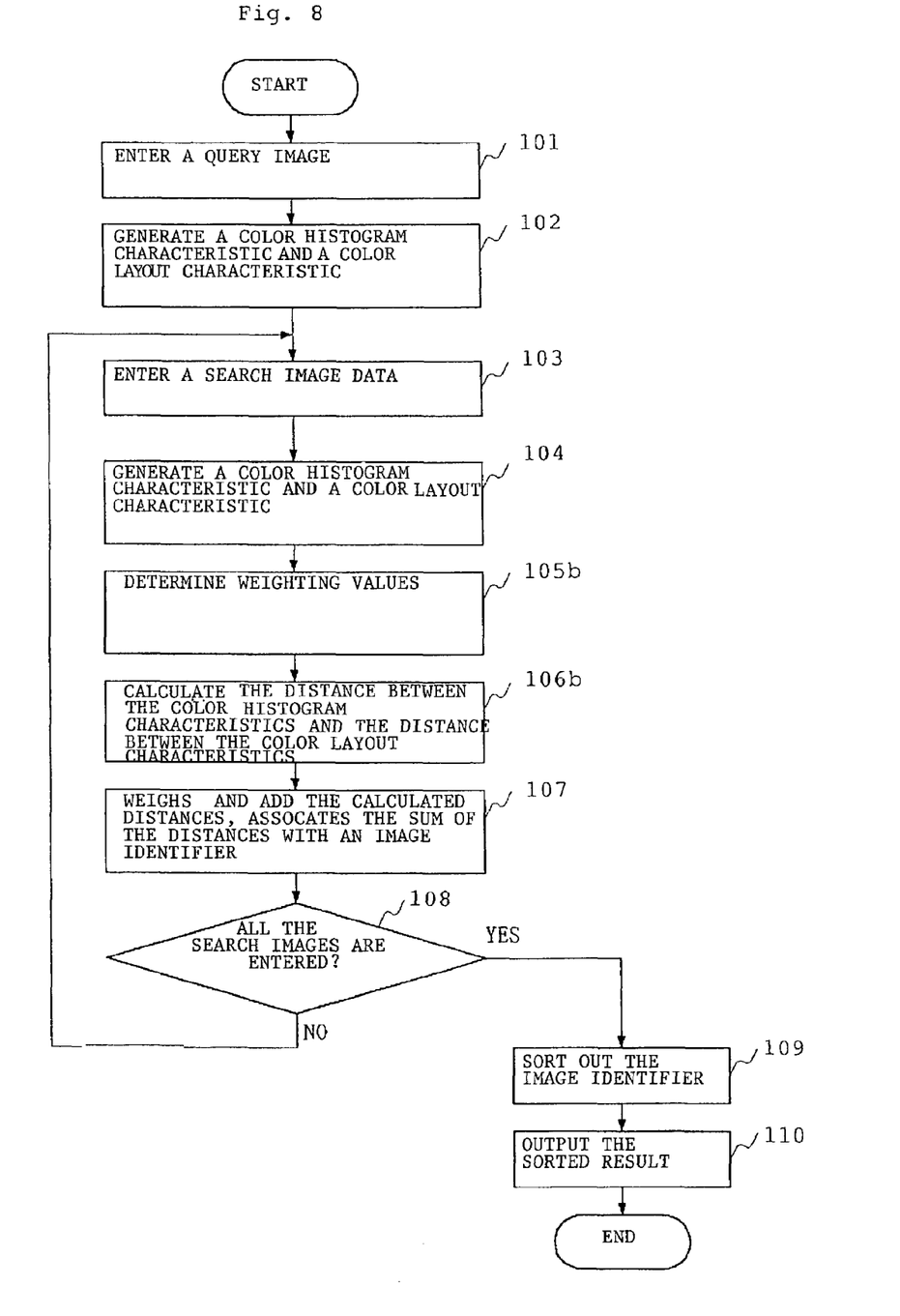
FIG. 8 is a flowchart of an operation sequence of the apparatus for determining a similarity according to the third embodiment of the present invention.

An operation sequence of similarity determining apparatus 3c will be described below with reference to FIG. 8. The operation sequence shown in FIG. 8 differs from the operation sequence according to the first embodiment shown in FIG. 3 in that steps 105b, 106b are carried out instead of steps 105a, 106a. Only the processing in steps 105b, 106b will be described below.

In step 105b, weight determining unit 35b determines weighting values depending on the type of the color histogram characteristics. Then, in step 106b, color layout characteristic distance calculator 37b calculates the distance between the color layout characteristics using the weighting values, and color histogram characteristic distance calculator 36b calculates the distance between the color histogram characteristics.

According to the present embodiment, as described above, weight determining unit 35b determines weighting values for respective elements of the color layout characteristics depending on the type of the color histogram characteristics, and color layout characteristic distance calculator 37b calculates the distance between a characteristic generated by first color layout characteristic generator 32 and a characteristic generated by second color layout characteristic generator 34, using the weighing values determined by weight determining unit 35b. Therefore, color layout characteristic distance calculator 37b can calculate the distance between the color layout characteristics, excluding elements of a common nature contained in both the color layout characteristics and the color histogram characteristics. As a result, when a similarity between the query image and the search image is determined on the basis of the color histogram characteristic distance and the color layout characteristic distance, a similarity related to the common elements contained in both the color histogram characteristics and the color layout characteristics is prevented from being largely reflected in the determined similarity between the query image and the search image, so that the similarity between the query image and the search image can be determined with increased accuracy.

While the above embodiments of the present invention have been described in detail with reference to the drawings, specific arrangements of the present invention are not limited to the above embodiments, but various changes and modifications may be made in the embodiments without departing from the scope of the present invention. For example, the kinds of colors in color histogram information are not limited to a specific color space, but may belong to any one of an RGB color space, a YCbCr color space, and an HSV color space, etc. The DCT coefficient may be calculated using only some of the component colors, rather than all of the component colors. The characteristics referred to above do not need to be those of image signals, but may be those of audio signals. For example, when a audio signal interval which is similar to a audio signal interval having a certain length is to be retrieved by using both a characteristic extracted from the entire audio signal interval and a collection of characteristics extracted from respective divided segments of the audio signal interval, a audio signal interval which is more accurately similar to a audio signal interval having a certain length can be retrieved by setting a weighting value for the low-frequency component of the characteristic extracted from the entire audio signal interval.

4th Embodiment

Figure 9:
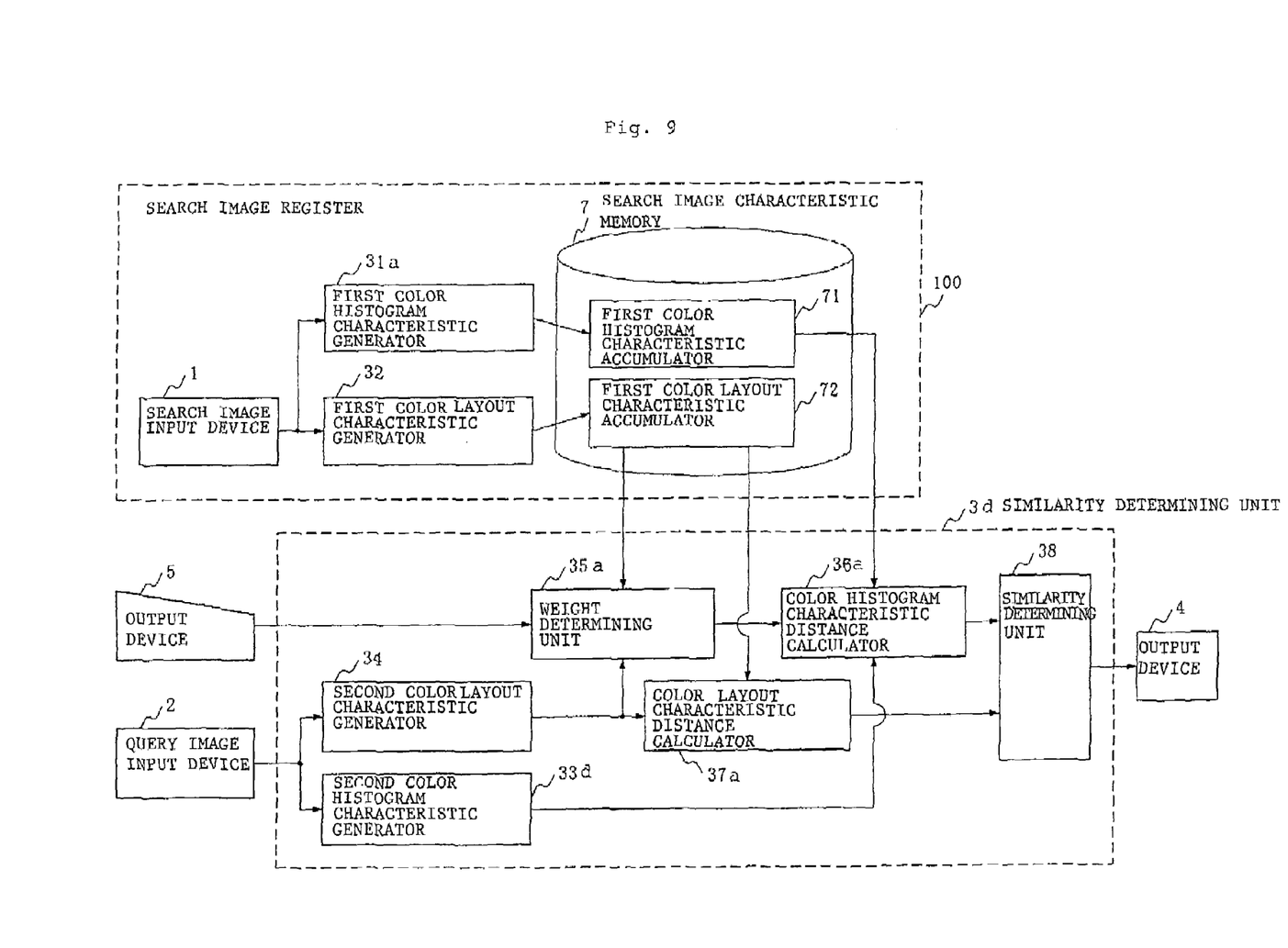
FIG. 9 is a block diagram of an apparatus for determining a similarity according to a fourth embodiment of the present invention.

FIG. 9 shows in block form an apparatus for determining a similarity according to a fourth embodiment of the present invention. The similarity determining apparatus according to the fourth embodiment is intended to increase the processing speed of similarity determining apparatus 3a according to the first embodiment shown in FIG. 2.

The similarity determining apparatus, generally denoted by 3d, is connected to search image register 100, a query image input device 2, output device 4, and input device 5.

Search image register 100 comprises search image input device 1, first color histogram characteristic generator 31a, first color layout characteristic generator 32, and search image characteristic memory 7 having first color histogram characteristic accumulator 71 and second color layout characteristic accumulator 72.

Each time first color histogram characteristic generator 31a is supplied with a search image from search image input device 1, first color histogram characteristic generator 31a generates a color histogram characteristic of the search image and accumulates the generated color histogram characteristic in first color histogram characteristic accumulator 71. Each time first color layout characteristic generator 32 is supplied with a search image from search image input device 1, first color layout characteristic generator 32 generates a color layout characteristic of the search image and accumulates the generated color layout characteristic in second color layout characteristic accumulator 72. The color histogram characteristic generated by first color histogram characteristic generator 31a and the color layout characteristic generated by first color layout characteristic generator 32 can be identical to those generated by first color histogram characteristic generator 31a and first color layout characteristic generator 32 according to the first embodiment.

Similarity determining apparatus 3d comprises second color histogram characteristic generator 33a, second color layout characteristic generator 34, weight determining unit 35a, color histogram characteristic distance calculator 36a, color layout characteristic distance calculator 37a, and similarity determining unit 38.

Weight determining unit 35a determines weighting values, which are used for color histogram characteristic distance calculator 36a to determine the distance between a color histogram characteristic of a query image and color histogram characteristics of search images that are accumulated in first color histogram characteristic accumulator 71, depending on the types of color layout characteristics of search images accumulated in second color histogram characteristic accumulator 72 and the type of a color layout characteristic of a query image generated by second color layout characteristic generator 34.

Color histogram characteristic distance calculator 36a calculates the distances between the color histogram characteristics of the search images that are accumulated in first color histogram characteristic accumulator 71 and a color histogram characteristic generated by second color histogram characteristic generator 33a, using the weighting values determined by the weight determining unit 35a.

Color layout characteristic distance calculator 37a calculates the distances between the color layout characteristics of the search images that are accumulated in first color histogram characteristic accumulator 72 and the color layout characteristic generated by second color layout characteristic generator 34. Those parts shown in FIG. 9 which are identical to those shown in FIG. 2 are denoted by identical reference characters.

Figure 10:
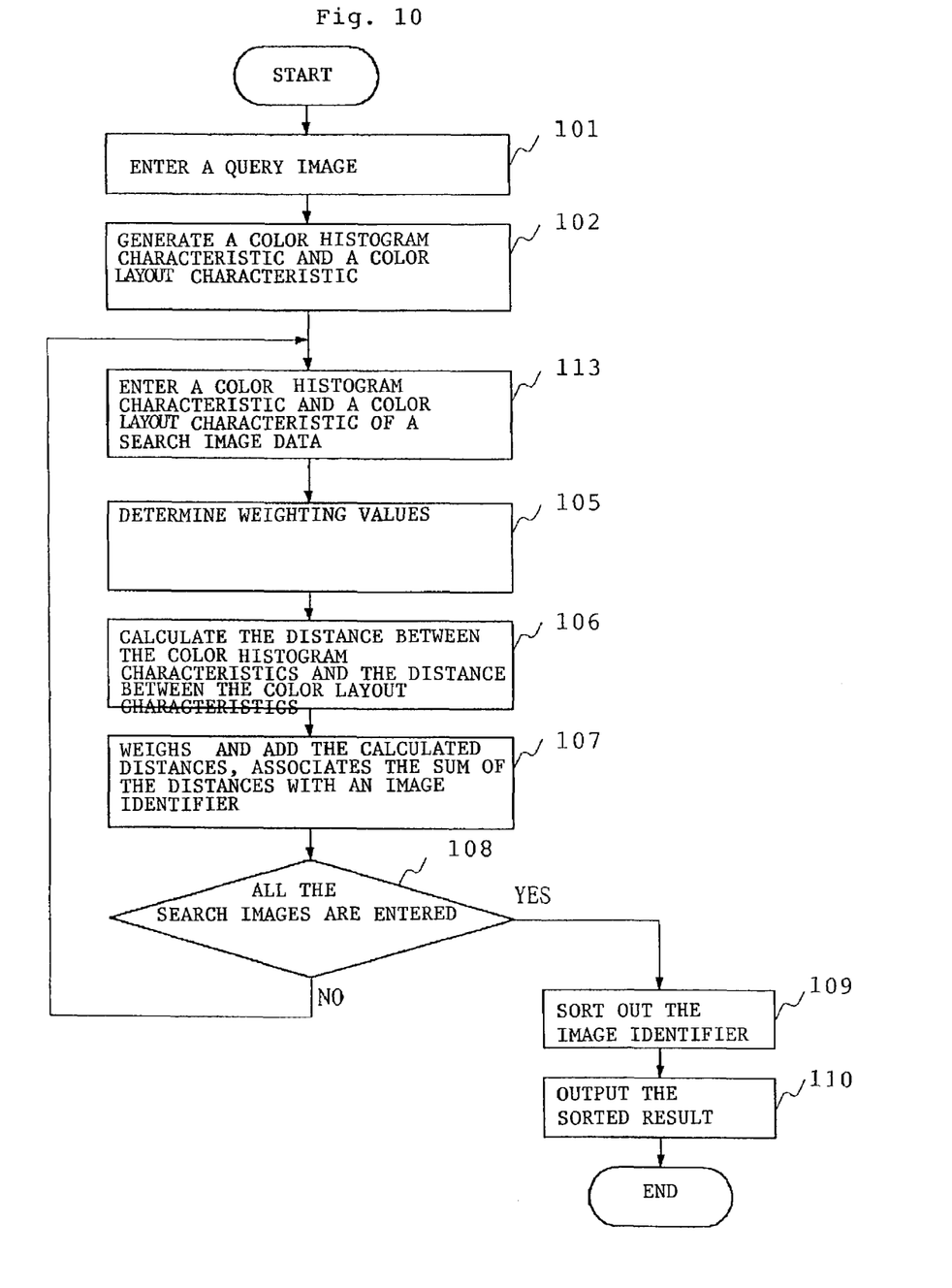
FIG. 10 is a flowchart of an operation sequence of the apparatus for determining a similarity according to the fourth embodiment of the present invention.

An operation sequence of the similarity determining apparatus shown in FIG. 9 will be described below with reference to FIG. 10.

In step 101, a query image is entered from query image input device 2. In step 102, second color histogram characteristic generator 33a and second color layout characteristic generator 34 generate a color histogram characteristic and a color layout characteristic, respectively, of the query image. Thereafter, a color histogram characteristic and a color layout characteristic of a first search image are entered from search image characteristic memory 7 in step 113. In step 105, weight determining unit 35a determines weighting values for respective elements of the color histogram characteristics depending on the type of the color layout characteristics. Then, color histogram characteristic distance calculator 36a calculates the distance between the color histogram characteristics using the weighting values, and color layout characteristic distance calculator 37a calculates the distance between the color layout characteristics in step 106. Similarity determining unit 38 weighs and adds the calculated distances, associates the sum of the distances with an image identifier of the search image, and holds the image identifier thus associated in step 107.

The above processing in steps 103 through 107 is effected on all the search images. After the above processing is effected on all the search images, the answer to step 108 becomes affirmative. Then, similarity determining unit 38 sorts out the image identifiers held thereby in the ascending order of the magnitudes of the sums of distances in step 109, and outputs the sorted result to output device 4 in step 110.

In the present embodiment, the characteristics of search images are accumulated in search image characteristic memory 7. When a query image is entered, a similarity between the query image and search images is determined using the characteristics accumulated in search image characteristic memory 7. Since the process of determining characteristics of a search image is not required each time a query image is entered, the time required to determine a similarity is shortened.

In the second and third embodiments shown in FIGS. 4 and 7, color histogram characteristics and color layout characteristics of search images may be registered in search image characteristic memory 7, and a similarity between a query image and search images may be determined using the color histogram characteristics and the color layout characteristics which are registered in search image characteristic memory 7, as with the fourth embodiment shown in FIG. 9.

For example, in the second embodiment shown in FIG. 4, color histogram characteristics of respective search images which are generated by first color histogram characteristic generator 31b and color layout characteristics of search images which are generated by first color layout characteristic generator 32 may be accumulated in search image characteristic memory 7, and first color histogram characteristic converter 61, weight determining unit 35a, color histogram characteristic distance calculator 36a, color layout characteristic distance calculator 37a may successively use the color histogram characteristics and color layout characteristics of the search images which are accumulated in search image characteristic memory 7.

In the third embodiment shown in FIG. 7, color histogram characteristics of respective search images which are generated by first color histogram characteristic generator 31a and color layout characteristics of search images which are generated by first color layout characteristic generator 32 may be accumulated in search image characteristic memory 7, and weight determining unit 35b, color histogram characteristic distance calculator 36b, and color layout characteristic distance calculator 37b may successively use the color histogram characteristics and color layout characteristics of the search images which are accumulated in search image characteristic memory 7.

In the above embodiments, the similarity determining apparatus according to the present invention is implemented by hardware. However, a program for achieving the functions of the similarity determining apparatus may be stored in a computer-readable recording medium and may be executed by a computer. The computer-readable recording medium may comprise a recording medium such as a floppy disk, a magnetooptical disk, a CD-ROM, or the like, or a storage device such as a hard disk drive for use in a computer system or the like. Alternatively, the computer-readable recording medium may be a transmission medium or a transmission wave for dynamically holding a program for a short period of time, as in the transmission of the program through the Internet, or a memory such as a volatile memory for holding the program for a certain period of time in a computer system which acts as a server in the downloading event on the Internet.

While preferred embodiments of the present invention have been described in specific terms, such description is for illustrative purposes only, and it is to be understood that changes and variations may be made without departing from the spirit or scope of the following claims.

What is claimed is:

1. An apparatus for determining whether a query signal and a search signal are similar to each other or not, said apparatus comprising:
    means for generating a signal characteristic of a first type of said query signal;
    means for generating a signal characteristic of a second type of said query signal;
    means for determining weighting values for elements of said signal characteristic of the first type, which are used in determining the distance between a signal characteristic of a first type of said search signal and the signal characteristic of the first type of said query signal, depending on said second type;
    means for calculating the distance between the signal characteristic of the first type of said search signal and the signal characteristic of the first type of said query signal, based on the determined weighting values;
    means for calculating the distance between a signal characteristic of a second type of said search signal and the signal characteristic of the second type of said query signal; and
    means for determining a similarity between said search signal and said query signal based on the calculated distances.

2. An apparatus according to claim 1, further comprising:
    means for generating the signal characteristic of the first type of said search signal; and
    means for generating the signal characteristic of the second type of said search signal.

3. An apparatus according to claim 1, wherein said signal characteristic of the first type comprises a DC component and other components.

4. An apparatus according to claim 3, further comprising:
    means for converting the signal characteristic of the first type of said search signal into a DC component and other components; and
    means for converting the signal characteristic of the first type of said query signal into a DC component and other components;
    wherein said means for calculating the distance between the signal characteristics of the first type comprises means for calculating the distance between the signal characteristic of the first type of said search signal and the signal characteristic of the first type of said query signal, which have been converted, based on the determined weighting values.

5. An apparatus according to claim 3, wherein said means for determining weighting values comprises means for determining a weighting value for said DC component.

6. An apparatus according to claim 4, wherein said means for determining weighting values comprises means for determining a weighting value for said DC component.

7. An apparatus according to claim 1, wherein the signal characteristics of the first type represent how the signals are concentrated.

8. An apparatus according to claim 7, wherein said means for determining weighting values comprises means for determining a weighting value as to how the signals are concentrated.

9. An apparatus according to claim 1, wherein the signal characteristics of the first and second types comprise image characteristics.

10. An apparatus according to claim 1, wherein the signal characteristics of the first and second types comprise audio characteristics.

11. An apparatus according to claim 9, wherein the signal characteristics of the first type comprise color layout characteristics representing a color layout of an image and the signal characteristics of the second type comprise color histogram characteristics representing a color histogram of an image.

12. An apparatus according to claim 9, wherein the signal characteristics of the first type comprise color histogram characteristics representing a color histogram of an image and the signal characteristics of the second type comprise color layout characteristics representing a color layout of an image.

13. An apparatus according to claim 11, wherein said means for generating a signal characteristic of a second type of said query signal comprises means for generating said color histogram characteristics by converting said image into a matrix of local representative colors and thereafter perform DCT transformation of said matrix and quantizing transformed DCT coefficients.

14. An apparatus according to claim 12, wherein said means for generating a signal characteristic of a first type of said query signal comprises means for generating said color histogram characteristics by converting said image into a matrix of local representative colors and thereafter perform DCT transformation of said matrix and quantizing transformed DCT coefficients.

15. An apparatus according to claim 11, wherein said means for generating a signal characteristic of a first type of said query signal comprises means for generating said color layout characteristics by selecting one or more representative colors from the image and calculating information of a color distribution with respect to each of the representative colors.

16. An apparatus according to claim 12, wherein said means for generating a signal characteristic of a second type of said query signal comprises means for generating said color layout characteristics by selecting one or more representative colors from the image and calculating information of a color distribution with respect to each of the representative colors.

17. A computer readable medium for storing a program for enabling a computer to determine whether a query signal and a search signal are similar to each other or not, said computer program comprising:
　　a first instruction set for generating a signal characteristic of a first type of said query signal;
　　a second instruction set for generating a signal characteristic of a second type of said query signal;
　　a third instruction set for determining weighting values for elements of said signal characteristic of the first type, which are used in determining the distance between a signal characteristic of a first type of said search signal and the signal characteristic of the first type of said query signal, depending on said second type;
　　a fourth instruction set for calculating the distance between the signal characteristic of the first type of said search signal and the signal characteristic of the first type of said query signal, based on the determined weighting values;
　　a fifth instruction set for calculating the distance between a signal characteristic of a second type of said search signal and the signal characteristic of the second type of said query signal; and
　　a sixth instruction set for determining a similarity between said search signal and said query signal based on the calculated distances.

18. A computer readable medium according to claim 17, further comprising:
　　a seventh instruction set for generating the signal characteristic of the first type of said search signal; and
　　an eighth instruction set for generating the signal characteristic of the second type of said search signal.

19. A computer readable medium according to claim 17, wherein said signal characteristic of the first type comprises a DC component and other components.

20. A computer readable medium according to claim 17, further comprising:
　　a ninth instruction set for converting the signal characteristics of the first type of said search signal into a DC component and other components; and
　　a tenth instruction for converting the signal characteristics of the first type of said query signal into a DC component and other components;
　　wherein said fourth instruction set comprises an instruction set for calculating the distance between the signal characteristic of the first type of said search signal and the signal characteristic of the first type of said query signal, which have been converted, based on the determined weighting values.

\* \* \* \* \*